United States Patent
Kumar et al.

(10) Patent No.: US 12,374,328 B2
(45) Date of Patent: *Jul. 29, 2025

(54) DYNAMIC DOMAIN-ADAPTED AUTOMATIC SPEECH RECOGNITION SYSTEM

(71) Applicant: Roku, Inc., San Jose, CA (US)

(72) Inventors: Atul Kumar, San Jose, CA (US); Elizabeth O. Bratt, Mountain View, CA (US); Minsuk Heo, Santa Clara, CA (US); Nidhi Rajshree, Los Gatos, CA (US); Praful Chandra Mangalath, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,077

(22) Filed: Nov. 16, 2023

(65) Prior Publication Data
US 2024/0096315 A1    Mar. 21, 2024

Related U.S. Application Data

(63) Continuation of application No. 17/214,462, filed on Mar. 26, 2021, now Pat. No. 11,862,152.

(51) Int. Cl.
*G10L 15/187* (2013.01)
*G06F 40/205* (2020.01)
(Continued)

(52) U.S. Cl.
CPC .......... *G10L 15/187* (2013.01); *G06F 40/205* (2020.01); *G06F 40/295* (2020.01);
(Continued)

(58) Field of Classification Search
CPC ... G10L 15/187; G10L 15/1822; G10L 15/22; G10L 25/33; G06F 40/205; G06F 40/295
See application file for complete search history.

(56) References Cited

U.S. PATENT DOCUMENTS 9,454,957 B1    9/2016    Mathias et al.
9,934,777 B1    4/2018    Joseph et al.
(Continued)

OTHER PUBLICATIONS

Extended European Search Report issued in European Patent Application No. 22164531.0, mailed Sep. 5, 2022, 8 pages.

*Primary Examiner* — Michael N Opsasnick
(74) *Attorney, Agent, or Firm* — Sterne, Kessler, Goldstein & Fox P.L.L.C.

(57) ABSTRACT

Disclosed herein are system, apparatus, article of manufacture, method, and computer program product embodiments for adapting an automated speech recognition system to provide more accurate suggestions to voice queries involving media content including recently created or recently available content. An example computer-implemented method includes transcribing the voice query, identifying respective components of the query such as the media content being requested and the action to be performed, and generating fuzzy candidates that potentially match the media content based on phonetic representations of the identified components. Phonetic representations of domain specific candidates are stored in a domain entities index and is continuously updated with new entries so as to maintain the accuracy of the speech recognition of voice queries for recently created or recently available content.

20 Claims, 7 Drawing Sheets

(51) Int. Cl.
*G06F 40/295* (2020.01)
*G10L 15/18* (2013.01)
*G10L 15/22* (2006.01)
*G10L 25/33* (2013.01)

(52) U.S. Cl.
CPC .......... *G10L 15/1822* (2013.01); *G10L 15/22* (2013.01); *G10L 25/33* (2013.01)

(56) References Cited

U.S. PATENT DOCUMENTS

| | | | |
|---|---|---|---|
| 10,109,273 | B1 | 10/2018 | Rajasekaram et al. |
| 10,885,918 | B2 | 1/2021 | Hsu et al. |
| 11,862,152 | B2* | 1/2024 | Kumar ................. G06F 40/295 |
| 2002/0116196 | A1* | 8/2002 | Tran ...................... G06F 1/3203 |
| | | | 704/E15.045 |
| 2008/0270138 | A1* | 10/2008 | Knight ................. G06F 16/434 |
| | | | 704/E15.045 |
| 2009/0112593 | A1* | 4/2009 | Konig .................... G10L 15/26 |
| | | | 704/251 |
| 2014/0201126 | A1* | 7/2014 | Zadeh .................... A61B 5/165 |
| | | | 706/52 |
| 2016/0275945 | A1* | 9/2016 | Elisha .................. G06F 16/638 |
| 2020/0402501 | A1* | 12/2020 | Prabhavalkar .......... G10L 15/16 |
| 2021/0183361 | A1* | 6/2021 | Silverzweig ............ G10L 13/04 |
| 2021/0287069 | A1* | 9/2021 | Mumcuyan ....... G06F 16/90344 |
| 2021/0295846 | A1* | 9/2021 | Yang ...................... G10L 25/30 |
| 2021/0343277 | A1* | 11/2021 | Jaber ...................... G10L 15/14 |

* cited by examiner

DYNAMIC DOMAIN-ADAPTED AUTOMATIC SPEECH RECOGNITION SYSTEM

CROSS REFERENCE TO RELATED APPLICATIONS

This application is a continuation of U.S. patent application Ser. No. 17/214,462, now issued as U.S. Pat. No. 11,862,152, filed on Mar. 26, 2021, the contents of which are incorporated herein by reference in its entirety.

BACKGROUND

Field

This disclosure is generally directed to improvements to conventional automatic speech recognition systems, and specifically, adapting such systems to improve their accuracy and performance in the real-time domains, such as but not limited to an entertainment domain.

Background

Speech as an input modality has become widely adopted in the media content space to provide voice-based input capability for navigating and finding media content on entertainment systems. Automatic Speech Recognition (ASR) systems have increased importance in these entertainment systems as they are responsible for recognizing speech input that involve media content. Errors, such as domain mismatch, may occur with ASR systems when attempting to recognize queries involving media content. These errors stem from two constraints related to ASR systems. First, they are pre-trained based on large amounts of public domain data that are available at the time of training and there is no efficient means to re-train ASR systems with new data. Second, ASR systems are generalists so that they may be implemented in a wide variety of applications. As such, conventional "off-the-shelf" ASR systems are typically trained to cover speech inputs from a broad range of speech domains having a generally known lexicon such as map/directions, application commands, weather commands, and general conversation phrases.

There are different types of speech domains. Static domains are those where the entities (i.e., the words or phrasing) to be recognized generally stay the same from when the ASR was trained, such as weather commands (e.g., "What's the weather today") or application commands (e.g., "Text Sarah"; "I'll be home in 10 minutes"). Already trained or pre-configured ASR systems are therefore suitable for static domains to handle static entities.

On the hand, dynamic domains present a challenge. In contrast to static domains, dynamic domains are constantly evolving because these domains involve the introduction of new words, unique words, and unexpected pronunciations. Dynamic domains have constant and rapid release cycles and also can include live content (e.g., user-generated content) for which an ASR system cannot be trained before implementation. One example of a dynamic content domain is the entertainment domain which includes media content from popular culture where new content may be created and uploaded on a daily, even hourly, basis. Proliferation of user-upload sites where users and entertainment companies alike may upload video content has democratized the creation process for media content.

The fast-paced released cycle of such content means that the content and its associated audio data are an on-going reflection of popular culture's ever evolving parlance and slang. Because they are trained and preconfigured prior to implementation, conventional ASR systems have difficulty with dynamic content domains where the new entertainment entities can involve these new pronunciations. Domain mismatch occurs when conventional ASR systems process speech inputs that require searching entities in dynamic domains. Speech recognition capability in dynamic domains are therefore hampered by conventional ASR systems.

SUMMARY

Provided herein are system, apparatus, article of manufacture, method and/or computer program product embodiments, and/or combinations and sub-combinations thereof, for adapting ASR systems for processing dynamic domain voice queries.

In a non-limiting embodiment, an example system includes a domain adapted audio command processing module having an automatic speech recognition engine to process voice queries within a dynamic domain. The domain adapted audio command processing module may perform steps for processing the voice query and generating domain-specific fuzzy candidates that potentially match with the content being requested by the voice query. The domain adapted audio command processing module may receive the voice query that includes an action and requested media content. The requested media content may be within the entertainment domain such as television, movies, or music. The domain adapted audio command processing module may further generate a textual representation, or transcription, of the voice query. This transcription may be performed using the automatic speech recognition engine implemented within the domain adapted audio command processing module. The domain adapted audio command processing module may further parse the transcription to identify command components within the transcription. Examples of a command component include an entity, an intent of the voice query, and an action to be performed on the media content. The entity command component may represent the best guess by the automatic speech engine as to the requested media content within the voice query. If there is a domain mismatch, the entity command component will be an imperfect match to the requested media content.

The domain adapted audio command processing module attempts to identify the requested media content from the voice query using the entity command component (which may not match the requested media content). To do so, the domain adapted audio command processing module may identity the entity command component within the transcription and convert the identified entity into one or more phonetic representations of the entity. Examples of a phonetic representation include grapheme, a phoneme, and an N-gram. Based on the phonetic representations, the domain adapted audio command processing module may then generate a fuzzy candidate list comprising a plurality of fuzzy candidates. Fuzzy candidates represent potential matches to the media content; the matching may be based on using at least one phonetic representation and the entity to identify fuzzy candidates with similar phonetic representations. The fuzzy candidates represent domain-specific candidates associated with the voice query and that are based on the most current entities available. And after identifying a list of fuzzy candidates, the domain adapted audio command processing module may then rank candidates in the fuzzy candidate list to form a ranked fuzzy candidate list which may include a highest ranked fuzzy candidate.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
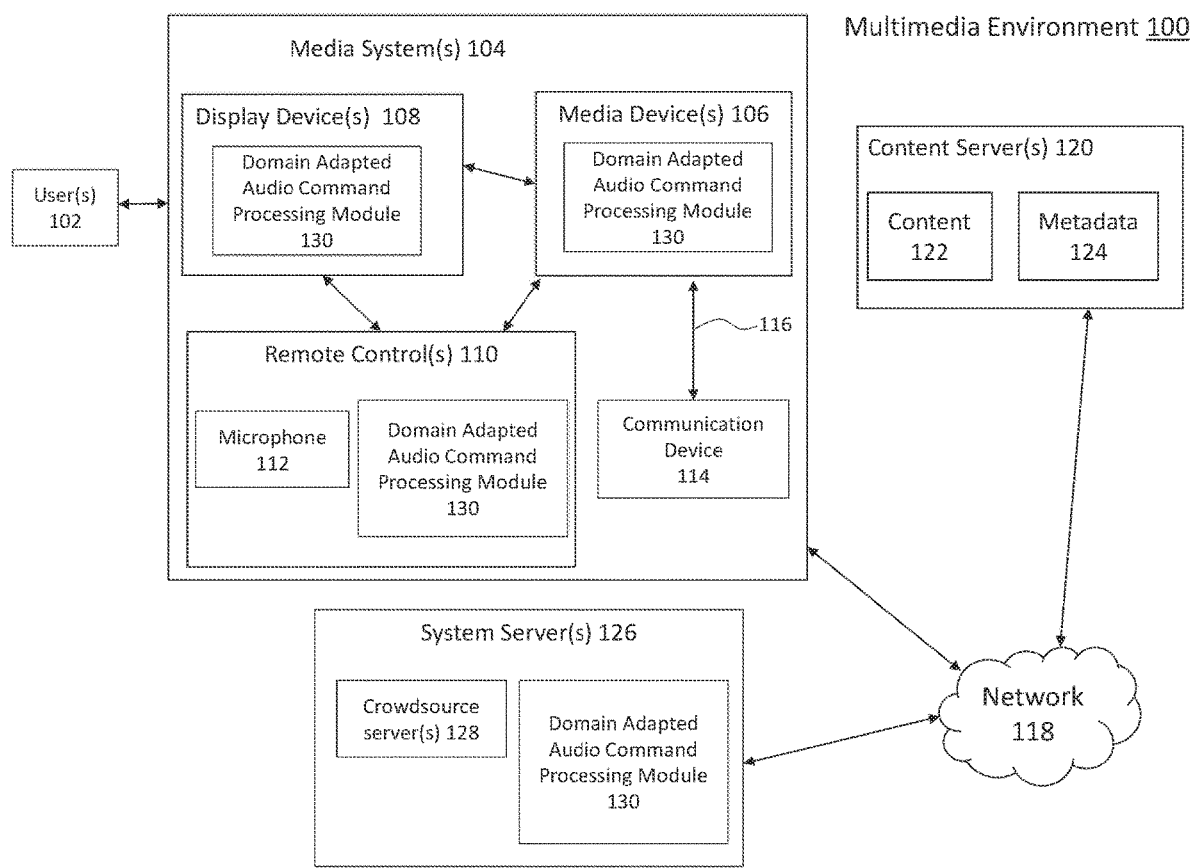
FIG. 1 illustrates a block diagram of a multimedia environment, according to some embodiments.

Provided herein are system, apparatus, article of manufacture, method and/or computer program product embodiments, and/or combinations and sub-combinations thereof, for adapting ASR systems to process voice queries involving content within dynamic domains. This adaptation involves the use of multiple ASR modules, including a second level module that is tailored to handle dynamic domain voice queries and provide domain-specific candidates in response to a voice query involving content in dynamic domains.

As indicated above, voice queries may require retrieving content in dynamic domains such as the entertainment domain that encompasses new media content from movies, songs, television shows, etc., as well as from user-generated content sites. For example, a user may submit voice queries for a movie titled "NOMADLAND" or for a kids show called "PAW PATROL." These titles are not conventional words or phrases; they are unique and novel as most titles are with respect to media content. A conventional ASR system would likely produce a domain mismatch when attempting to process a voice query involving these titles (e.g., "Play NOMADLAND" or "Search for PAW PATROL episodes").

Domain mismatches with these titles are likely to occur because of their phonetic similarities to other words and the static nature of conventional ASR systems. For example, a conventional ASR system might translate "NOMADLAND" into "Nomad" and "Land" or perhaps even as a more well-established phrase, "No Man's Land" and "PAW PATROL" into "Pop Patrol." A conventional ASR system would likely not recognize these titles as being associated with media content and therefore provide inaccurate translations that are irrelevant to the voice query. Put another way, the translations may be phonetically correct (e.g., "PAW PATROL" vs. "Pop Patrol") but they are not relevant to the entertainment domain.

The disclosure herein describes dynamic domain adaptation for ASR embodiments for more accurately processing voice queries that involve content in dynamic domains such an entertainment domain involving ever changing media content. The result is a novel two level ASR system that involves, at the first level, an ASR engine for performing a translation of a voice query and, at the second level, a candidate generator that is linked to a domain-specific entity index that can be continuously updated in real-time with new entities. Such an implementation allows for new entities to be included as part of the ASR processing without having to re-train the ASR engine or large amounts of domain data. In order to achieve this real-time domain adaptation, the domain-specific entity index may be configured to store textual information associated with new entities such as their phonetic representation and other relevant metadata (e.g., content type, information source, grapheme information, 3-gram information, and popularity score).

In a given embodiment, the two level ASR system may be implemented in a voice input device (also called voice responsive device or audio responsive device) that includes a microphone capable of receiving speech. Examples of a voice input device include a remote control device or a media device. A remote control device may be implemented as a dedicated remote control device with physical buttons or a mobile device with an installed software application providing remote control functionality to the mobile device. A media device may be any device that has media streaming capability such as a standalone media device that externally connects to a display device or a display device that has an integrated media device. Examples of a standalone media device include a media streaming player and a sound bar.

Accordingly, various embodiments of this disclosure may be implemented using and/or may be part of a multimedia environment 100 shown in FIG. 1. It is noted, however, that multimedia environment 100 is provided solely for illustrative purposes, and is not limiting. Embodiments of this disclosure may be implemented using and/or may be part of environments different from and/or in addition to the multimedia environment 100, as will be appreciated by persons skilled in the relevant art(s) based on the teachings contained herein.

Also, the embodiments of this disclosure are applicable to any voice responsive devices, not just those related to entertainment systems such as multimedia environment 100. Such voice responsive devices include digital assistants, smart phones and tablets, appliances, automobiles and other vehicles, and Internet of Things (IOT) devices, to name just some examples.

An example of the multimedia environment 100 shall now be described.

Multimedia Environment

In a non-limiting example, multimedia environment 100 may be directed a system for processing audio commands involving streaming media. However, this disclosure is applicable to any type of media (instead of or in addition to streaming media), as well as any mechanism, means, protocol, method and/or process for distributing media where audio commands may be processed in order to request media.

The multimedia environment 100 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 102 may operate with the media system 104 to select and consume media content by, for example, providing audio commands to request media content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, a sound bar, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. In an embodiment, the remote control 110 may be integrated into media device 106 or display device 108. The remote control 110 may include a microphone 112, which is further described below.

Any device in media system 104 may be capable of receiving and processing audio commands from user(s) 102. Such devices may be referred to herein as audio or voice responsive devices, and/or voice input devices. For example, any one of media device 106, display device 108, or remote control 110 may include a domain adapted audio command processing module 130 that receives audio commands requesting media content, processes the audio commands, and performs actions for retrieving and providing the requested media content to media system 104. In an embodiment, microphone 112 may also be integrated into media device 106 or display device 108, thereby enabling media device 106 or display device 108 to receive audio commands directly from user 102. Additional components and operations of domain adapted audio command processing module 130 are described further below with regard to FIGS. 2-5 below. While domain adapted audio command processing module 130 may be implemented in each device in media system 104, in practice, domain adapted audio command processing modules 130 may also be implemented as a single module within one of media device 106, display device 108, and/or remote control 110.

The multimedia environment 100 may include a plurality of content servers 120 (also called content providers or sources). Although only one content server 120 is shown in FIG. 1, in practice the multimedia environment 100 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 100 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 102 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming sessions of the movie.

The system servers 126 may also include a domain adapted audio command processing module 130. FIG. 1 depicts domain adapted audio command processing module 130 implemented in media device 106, display device 108, remote control 110, and system server 126, respectively. In practice, domain adapted audio command processing modules 130 may be implemented as a single module within just one of media device 106, display device 108, remote control 110, or system server 126, or in a distributed manner as shown in FIG. 1.

As noted above, the remote control 110 may include a microphone 112. The microphone 112 may receive spoken audio data from users 102 (as well as other sources, such as the display device 108). As noted above, the media device 106 may be audio responsive, and the audio data may represent audio commands (e.g., "Play a movie," "search for a movie") from the user 102 to control the media device 106 as well as other components in the media system 104, such as the display device 108.

In some embodiments, the audio data received by the microphone 112 in the remote control 110 is processed by the device in which the domain adapted audio command processing module 130 is implemented (e.g., media device 106, display device 108, remote control 110, and/or system server 126).

For example, in an embodiment where the domain adapted audio command processing module 130 is implemented in media device 106, audio data may be received by the media device 106 from remote control 110. The transfer of audio data may occur over a wireless link between remote control 110 and media device 106. Also or alternatively, where voice command functionality is integrated within display device 108, display device 108 may receive the audio data directly from user 102.

The domain adapted audio command processing module 130 that receives the audio data may operate to process and analyze the received audio data to recognize the user 102's audio command. The domain adapted audio command processing module 130 may then perform an action associated with the audio command such as identifying potential candidates associated with the requested media content, forming a system command for retrieving the requested media content, or displaying the requested media content on the display device 108.

As noted above, the system servers 126 may also include the domain adapted audio command processing module 130. In an embodiment, media device 106 may transfer audio data to the system servers 126 for processing using the domain adapted audio command processing module 130 in the system servers 126.

Figure 2:
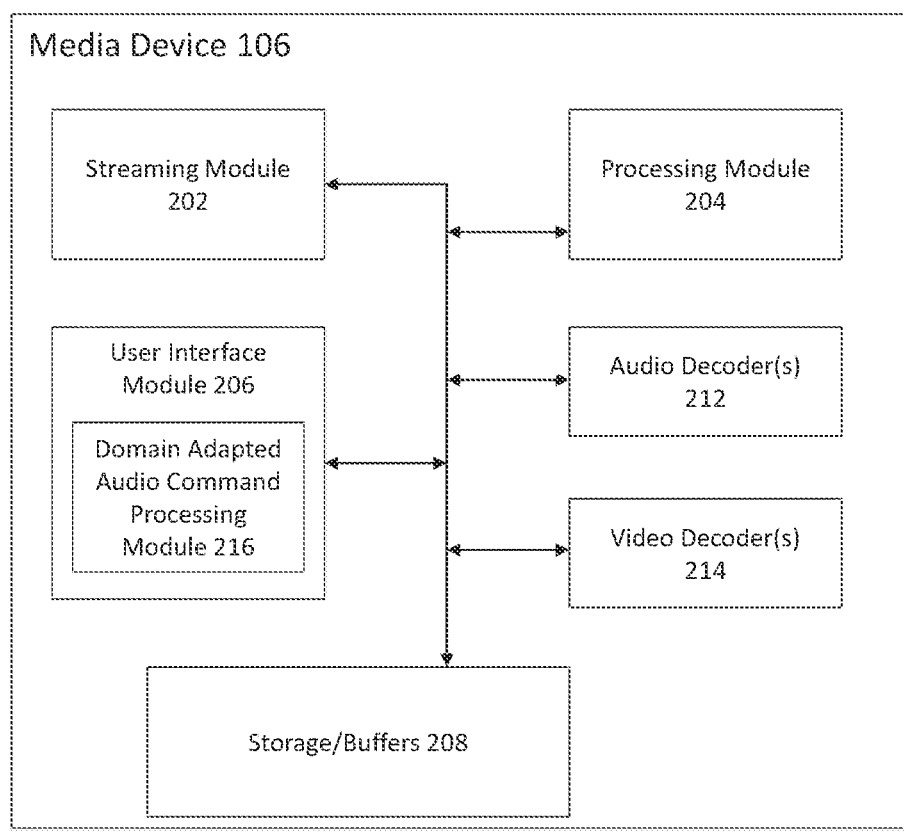
FIG. 2 illustrates a block diagram of a streaming media device, according to some embodiments

FIG. 2 illustrates a block diagram of an example media device 106, according to some embodiments. Media device 106 may include a streaming module 202, processing module 204, storage/buffers 208, and user interface module 206. As described above, the user interface module 206 may include the domain adapted audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 102 may interact with the media device 106 via, for example, the remote control 110. As noted above, remote control 110 may be implemented separately from media device 106 or integrated within media device 106. For example, the user 102 may use the remote control 110 to verbally interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 102.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Domain Adapted Audio Command Processing

Referring to FIG. 1, the domain adapted audio command processing module 130 may be implemented within any device of media system 104 and may be configured to process audio data received from user 102. The domain adapted audio command processing module 130 supports processing audio commands in the context of dynamic content domains and provides faster and more accurate translations of audio commands that involve media content in these domains. The domain adapted audio command processing module 130 may utilize a domain entity index, which provides information about more current entities (i.e., entities that an ASR engine would not recognize).

The domain entity index may be implemented separately from an ASR engine and may be continuously updated with information about new entities (e.g., content titles) including their phonetic representations from dynamic domains. The domain entity index indexes the entities with the phonetic representations. This index allows for faster processing of audio commands because phonetic forms may be quickly searched to identity potentially relevant entities. This continuous updating of the domain entity index is in contrast to conventional systems utilizing a pre-trained ASR engine. In order to update the ASR engine, large amounts of additional domain data is needed to retrain the ASR engine. Because the domain entity index operates based on phonetic forms, new media content can be quickly indexed and ready for searching even for newly available content. The index may be continuously updated with new entities and their phonetic forms so that the index is able to provide accurate transcriptions of more current entities than conventional ASR engines. Sources of these entities may come from recently released content (e.g., live events such as a presidential debate), user-upload sites where new content is uploaded on a daily basis, or other online resources for media content such as WIKIPEDIA or INTERNET MOVIE DATABASE (IMDB). The candidates provided by domain adapted audio command processing module 130 in response to audio commands in the dynamic domain are therefore more accurate than conventional systems.

Figure 3:
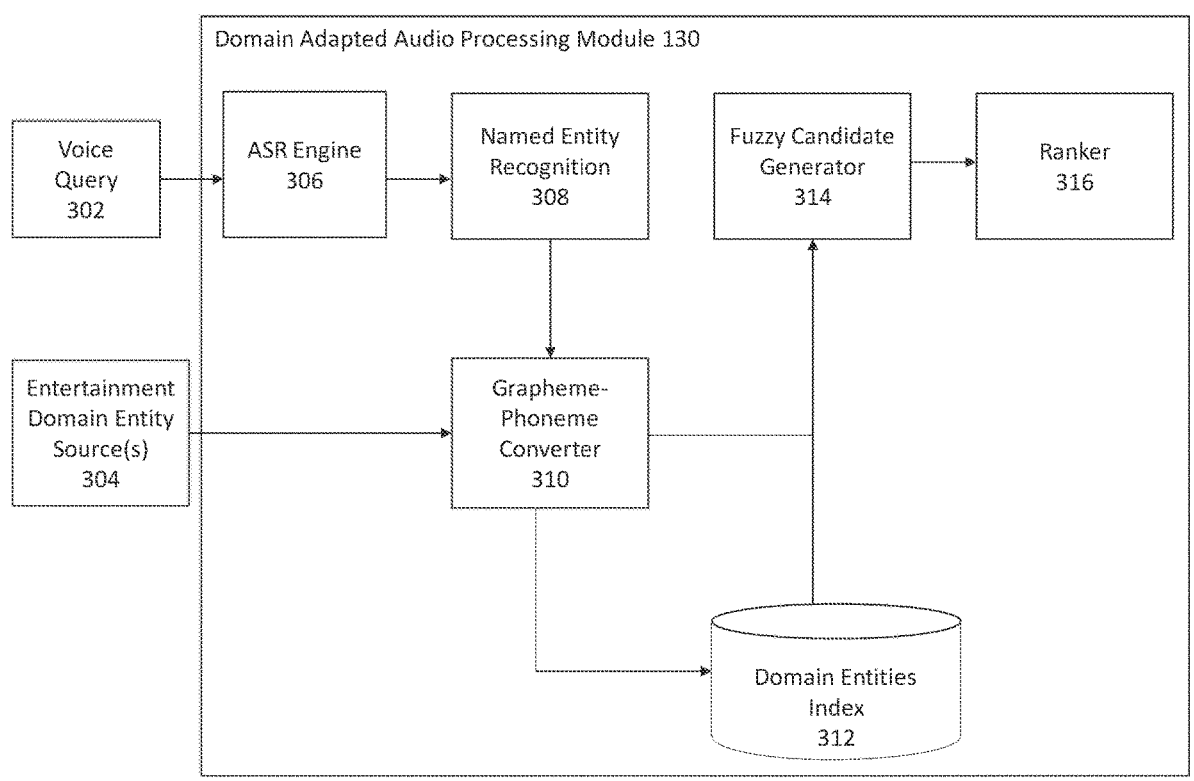
FIG. 3 illustrates a block diagram of a domain adapted audio command processing module, according to some embodiments.

FIG. 3 illustrates an example block diagram of domain adapted audio processing module 130, according to some embodiments. Domain adapted audio processing module 130 may include an ASR engine 306, named entity recognition component 308, grapheme-phoneme converter 310, domain entities index 312, fuzzy candidate generator 314, ranker 316, any other suitable hardware, software, device, or structure, or any combination thereof. In some embodiments, domain adapted audio processing module 130 may operate in an ingestion and run-time mode. The ingestion mode may include operations when not processing a voice query, and may involve components grapheme-phoneme converter 310 and domain entities index 312 for processing entities received from entertain domain entity source(s) 304 (i.e., ingesting new entities).

The term "entities" is used to refer to specific content of media content such as a specific movie, song, or television show, etc., and may be associated with different types of metadata such as movie titles, music titles, actor names, music artists, titles of media content including user-generated content, and popular phrases (e.g., lyrics from songs, dialogue from movies), just to name a few examples.

Now referring to FIGS. 1, 2, and 3, in some embodiments, domain adapted audio processing module 130 may include an ASR engine 306 configured to receive voice query 302 which, depending on where device domain adapted audio processing module 130 is implemented, may be provided by another device within media system 104 or directly from user 102. ASR engine 306 may be implemented as a pre-trained ASR system that has been trained on public domain data available at the time of training. In an embodiment, ASR engine 306 may be an "off-the-shelf" engine that has not been modified, or has not received any additional training. ASR engine 306 may translate voice query 302 into a transcription or text format of the voice query. In an embodiment, voice query 302 includes an audio command for retrieving media content.

The transcription provided by ASR engine 306 may not accurately reflect the media content requested by the voice query 302 but may nonetheless accurately reflect the phonetic form of the requested media content. For example, in response to a voice query "Play PAW PATROL," ASR engine 306 may transcribe the audio command as "Play Pop Patrol." As another example, ASR engine 306 may transcribe the audio command "Play THE DARK KNIGHT RISES" as "Play The Dark Night Rises." These errors are examples of domain mismatch where the transcription may be an accurate phonetic representation of the voice query but not of the actually requested media content. Such errors by the ASR engine 306 are addressed by downstream components in domain adapted audio processing module 130. Importantly, the transcription provided by ASR engine 306 does not need to be an accurate reflection of the requested media content.

Named entity recognition (NER) component 308 is configured to receive the transcription from ASR engine 306. The transcription is a textual representation of command components that form the audio command. Examples of command components including an intent, an action, and an entity. In an example where the voice query 302 includes the audio command "Play PAW PATROL" and the resulting transcription is "Play Pop Patrol," then the action command component of the transcription is the "Play" action, the entity command component is "Pop Patrol," and the intent component is a "video request." NER 308 parses the transcription and performs recognition of the constituent command components within the transcription. The intent command component identifies the purpose of voice query 302 such as requesting media content; the action command component identifies the action to be performed on the requested media content; and the entity identifies the media content on which the action is to be performed. NER 308 identifies these command components—intent, action, and entity—and provides the entity as a token (text format) to grapheme-phoneme converter 310.

An entity may refer to the media content and the token refers to a textual form of the media content. A token is therefore merely an underspecified text and/or an erroneous ASR transcription and one goal of the present disclosure is to link the text form (i.e., token) to a corresponding media content (i.e., entity). After transcription, the "PAW PATROL" in example audio command "Play PAW PATROL" represents a token. The token is linked to a corresponding entity, "Paw Patrol," with a type "TV Show." In an embodiment, tokens are derived from transcriptions while entities are derived from sources (e.g., Wikidata) of known entities in the entertainment domain.

Grapheme-phoneme converter 310 receives the entity, identifies the language of the entity (e.g., English), and performs a language-specific conversion process which involves converting the text format of the entity into phonetic forms. Phonetic forms include the phoneme of the entity and are used to search for a matching entity in the database. There are different known kinds of phonetic forms: New York State Identification and Intelligence System ("NYSIIS") and International Phonetic Alphabet ("IPA"). The phoneme represents the phonetic pronunciation of the entity (e.g., "pap pʌtɹoːl" for the IPA form and "P PATRAL" for the NYSIIS phonetic form). NYSIIS is a lossy phonetic form that provides an approximation of the entity and allows for a faster method for determining a predetermined number (e.g., 100) of relevant entity candidates from a database of millions of entity candidates. IPA is a precise phonetic algorithm that may be utilized to calculate phonetic-edit-distance.

In an embodiment, other orthographic forms may be used to improve the ranking. Examples of these other orthographic forms include such as the grapheme of the entity, the N-gram of the entity, and a popularity score of the entity. The grapheme represents the text (spelling) of the entity (e.g., "PAW PATROL"). The N-gram represents a N-letter sequence of letters of the entity; for example, a 3-gram of "PAW PATROL" represents a 3-letter sequence of letters (e.g., "paw," "aw_," "w_p," "_pa," "pat," "atr," "tro," and "rol"). And the popularity score represents a value indicating the popularity of the entity with respect to other entities within media system (e.g., reflects which entities are requested or have been viewed more often than other entities). The entities with their phonetic forms are stored as an entry within domain entities index 312 and, if responding to voice query, may be provided to fuzzy candidate generator 314 for further processing.

The receipt and processing of voice queries (such as voice query 302) by the domain adapted processing module 130 may be considered a run-time process. In contrast, communication between grapheme-phoneme converter 310 and entertainment domain entity source(s) 304 may occur during the ingestion process. Communication between grapheme-phoneme converter 310 and entertainment domain entity source(s) 304 may occur continuously (e.g., in the background) such that new entities are provided to grapheme-phoneme converter 310, and subsequently to domain entities index 312, on a continuous basis. Examples of entertainment domain entity source(s) 304 include user-upload sites or other media content resources such as WIKIDATA or INTERNET MOVIE DATABASE (IMDB) that are constantly updated with new media content as they are released. Information may be retrieved from these sources through an automated means such as with a website crawler.

In an embodiment, communication between grapheme-phoneme converter 310 and entertainment domain entity source(s) 304 may occur as part of a push process where new media content entities are continuously pushed to grapheme-phoneme converter 310 as new entities are discovered. In another embodiment, domain adapted audio processing module 130 may pull new media content entities from entertainment domain entity source(s) 304 on an intermittent or scheduled basis.

Domain entities index 312 receives entities and their phonetic forms from grapheme-phoneme converter 310 and stores them as indexed entries so that the entries can be easily searched. Grapheme-phoneme converter 310 continuously updates domain entities index 312 when grapheme-phoneme converter 310 receives new entities from entertainment domain entity source(s) 304 as part of the ingestion process. These operations of the ingestion process allow new entities to be continuously stored in domain entities index 312 independently of training the ASR engine 306, and allow those entries to be made available for fuzzy candidate generator 314 to generate domain specific candidates when responding to voice query 302.

The ingestion process of domain adapted audio processing module 130 provides advantages over a conventional ASR system that would rely only on an off-the-shelf ASR engine such as ASR engine 306. By continuously updating entries and their associated phonetic forms in the domain entities index, the entries are available, in real-time, for responding to voice queries and domain adapted audio processing module 130 can generate candidates that are more relevant to voice query 302 in the entertainment domain. Domain adapted audio processing module 130 can quickly adapt to new terminology or potentially confusing content titles ("The Dark Night Rises" vs "THE DARK KNIGHT RISES"). In addition, use of a continuously updated index obviates the need to retrain the ASR engine. Yet another advantage provided by domains entity index 312 is that domain adapted audio processing module 130 may be quickly modified for different languages (language portability) because only phonetic forms of entries are required as opposed to large amounts of language specific training data for building or customizing the language specific speech model.

Fuzzy candidate generator 314 is responsible for generating domain specific candidates in response to voice query 302. The candidates generated by fuzzy candidate generator 314 may be considered fuzzy candidates because the candidates may not exactly match the entity representing the media content identified in the voice query. This is especially true when there is a domain mismatch in the transcription provided by ASR engine 306 such as with "The Dark Night Rises" compared with the actual audio command for "THE DARK KNIGHT RISES." In this example, there is no media content titled "The Dark Night Rises" so any suggested candidates would not perfectly match this token; accordingly, such candidates would be considered fuzzy candidates.

Fuzzy candidate generator 314 receives a token identifying the requested entity and its corresponding phonetic forms from grapheme-phoneme converter 310, and performs a search of the domain entities index 312 to retrieve candidates that are similar phonetically to the token. In an embodiment, the search performed by fuzzy candidate generator 314 includes at least one of a grapheme search, a phoneme search, and an N-gram (e.g., 3-gram) search. In an embodiment, the search includes all three searches—grapheme search, a phoneme search, and an N-gram—and fuzzy candidate generator 314 concatenates candidates generated by each search to populate a fuzzy candidate list.

The grapheme search includes a text spelling match based on matching the spelling of the token (e.g., "Pop Patrol") to graphemes in the domain entities index 312. The phoneme search includes a phonetic matching based on pronunciation where a phoneme of the token (e.g., "pap pʌt ɹoːl") matches phonemes in the domain entities index 312. The N-gram search is a combined grapheme-phoneme match based on matching the N-gram (e.g., "pop pat atr tro rol") to N-grams in the domain entities index 312; N-gram search may be considered a combination of the grapheme and phoneme matching of the token. Component of fuzzy candidate generator 314 are discussed in further detail for FIG. 4.

In an embodiment, the phoneme search utilizes both a lossy and a precise phonetic form to determine a matching entity. An advantage of both types of phonetic forms is that it increases efficiency of fuzzy candidate generator 314 at run-time. A lossy phonetic form reduces the number of potential candidates (e.g., millions) to a predetermined number (e.g., 100) while the precise phonetic form further reduces the predetermined number of candidates to the most relevant candidates (e.g., the top 3 or 5 candidates). For example, fuzzy candidate generator 314 may first employ a lossy phonetic form (e.g., NYSIIS) to determine a number of relevant entity candidates. Next, fuzzy candidate generator 314 may utilize the precise phonetic algorithm (e.g., IPA) to calculate phonetic-edit-distance to rank the candidates that were generated using the lossy phonetic form. In an embodiment, the candidates with the smallest phonetic edit distance may be considered to be the most relevant.

The other orthographic forms—grapheme, N-gram, spelling—to improve both the candidate generation using the lossy form (to generate the predetermined number of candidates) as well as with the precise form to improve the ranking using phonetic edit distance. Fuzzy candidate generator 314 may index all phonetic and orthographic forms in domain entities index 312.

Ranker 316 ranks the fuzzy candidate list generated by fuzzy candidate generator 314 to provide a ranked candidate list identifying domain adapted transcriptions associated with the voice query. The fuzzy candidate list represents a reduced set of candidates pulled from the domain entities index 312 and allows ranker 316 to perform its operations at run-time because only a small set of candidates (as opposed to the full amount of candidates from domain entities index 312) need to be processed and matched with the token.

Ranker 316 may consider a number of different factors when ranking the candidates provided by fuzzy candidate generator 314 including but not limited to phonetic edit distance, match count, longest common sequence, nospace overlap, and popularity. The ranking of each candidate may be based on one or more of each of these factors. In an embodiment, each factor is assigned a numerical value to indicate candidates that provide a better match in each of the factors.

For example, phonetic edit distance may be represented by a numerical value that indicates the similarity between the phonemes of the token and of the candidate entity. As an example, if the transcription token is "hobs and shaw" (phonetic form "habz ænd ʃɔ") and the entity is "Hobbs and Shaw" (phonetic form "habz ænd ʃɔ"), the phonetic edit distance between the token and the entity is 0 since both have identical phonetic forms. However, the text edit distance between them is 1 since a "b" is missing from token.

As another example, the popularity of each candidate may also be retrieved from domain entities index 312. The numerical value associated with popularity may indicate the frequency that the candidate (e.g., media content) was played, requested, or otherwise involved in an action within multimedia environment 100. For example, the popularity of an entity could refer to the number of streams by the thousands or millions of media systems 104 within multimedia environment 100. Accordingly, a higher value for popularity may indicate a higher number of streams within multimedia environment 100.

The numerical value for the match count factor may indicate how many matching-strategies—grapheme spelling, grapheme n-gram, phoneme—indicate that the potential candidate is a quality match. For example, if all three matching-strategies indicate a quality match, then the value for the match count factor is "3."

The numerical value for the longest common sequence may be based on the grapheme search and indicates the longest common sequence of matching text between the candidate and the token. For example, for the candidates "PAW PATROL" and "PAW PATROL toy play," the numerical values are the same since they both share the same text "Patrol" with the token "Pop Patrol."

The numerical value for nospace overlap may indicate the similarity scores between token and entities if spaces were removed." As an example, a "melissa fent" token may match "maleficent" real world entity if a space is removed from the token "melissa fent," resulting in "melissafent." A "melissa fent" token in response to an audio command requesting "maleficent" occurs with conventional ASR systems because off-the-shelf ASR does not understand have insight into the entertainment domain and may randomly inject spaces in the transcription. In this example, a conventional ASR may consider "maleficient" to be a person's name and adds a space after "Melissa."

An example ranked fuzzy candidate list is reproduced below with exemplary values for each of the factors.

| Candidate | Phonetic Edit Distance | Popularity | Match Count | Longest Common Sequence | NoSpace Overlap | Rank |
|---|---|---|---|---|---|---|
| Paw Patrol | 93 | 99 | 3 | 80 | 45 | 1 |
| Paw Patrol toy play | 84 | 50 | 1 | 80 | 25 | 2 |
| Patrol | 91 | 30 | 1 | 60 | 57 | 3 |
| American Pop | 86 | 92 | 1 | 30 | 7 | 4 |

Ranker 316 may then provide the top ranked candidate within the ranked fuzzy candidate list or a certain number of the top ranked candidates to an appropriate device for retrieval (e.g., content server 120), display (e.g., display device 108), or additional processing (e.g., media device 106). For example, the certain number of the top ranked candidates may be provided for display on display device 108 to allow for user 102 to select the appropriate candidate. In another embodiment, the top ranked candidate in the ranked fuzzy candidate list may be automatically retrieved (e.g., from content server 120) and played (e.g., by media device 106). In another embodiment, content server 120 may identify all streaming services that provide the top ranked candidate and generate a new list that displays the top ranked candidate along with the streaming services, and provide that to display device 108 for display.

Figure 4:
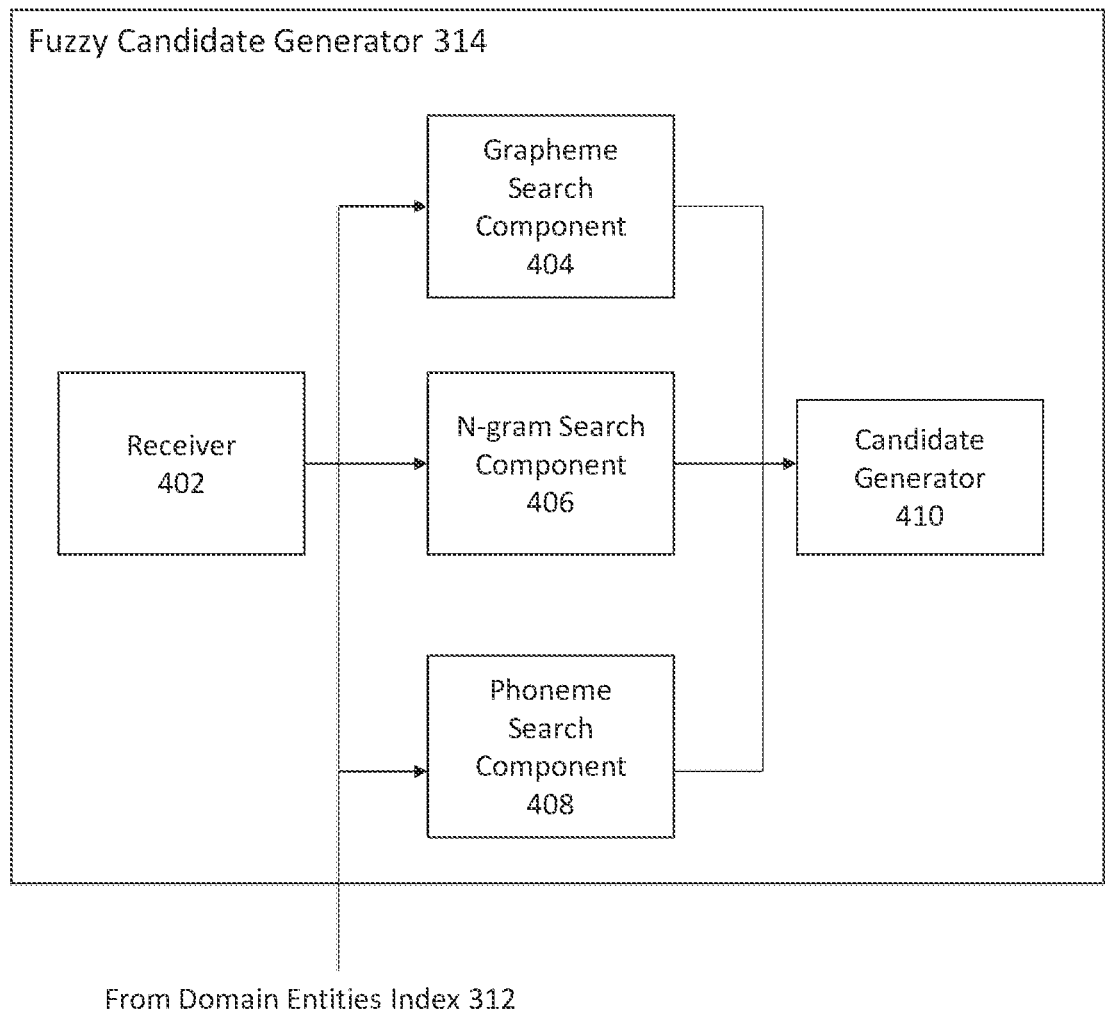
FIG. 4 is a block diagram of a fuzzy candidate generator, according to some embodiments.

FIG. 4 is a block diagram of a fuzzy candidate generator 314, according to some embodiments. Fuzzy candidate generator 314 may include receiver 402, grapheme search component 404, N-gram search component 406, phoneme search component 408, and candidate generator 410.

Receiver 402 receives the identified token and the phonetic forms from grapheme-phoneme converter 310, and initiates at least one search (and up to all three searches) from the grapheme search, the N-gram search, and the phoneme search. Receiver 402 routes the appropriate token and phonetic information respective components for each search.

For example, receiver 402 routes the token and its grapheme to grapheme search component 404. Grapheme search component 404 communicates with domain entities index 312 to search for graphemes that match the grapheme of the token. For example, grapheme search component 404 performs a search for the grapheme "Pop Patrol" (i.e., the grapheme of the token identified in the transcription provided by ASR engine 306) in domain entities index 312. Because domain entities index 312 has been updated with media content from the entertainment domain, the grapheme search may produce domain specific candidates based on the grapheme such as "Paw Patrol" and "American Pop." In an embodiment, the grapheme search component 404 performs a fuzzy match of the grapheme of the token with the grapheme candidates from domain entities index 312.

N-gram search component 406 may be implemented based on the number of letters to be searched. In an embodiment, n-gram search component 406 may be implemented as a 3-gram search component that searches for 3-grams associated with the token. N-gram search component 406 communicates with domain entities index 312 to search for n-grams that match the n-gram of the token. For example, n-gram search component 406 performs a search for the 3-gram "pop pat atr tro rol" (i.e., the 3-gram of the token identified in the transcription provided by ASR engine 306) in domain entities index 312. The n-gram search component 406 may then provide domain specific candidates based on the n-gram such as "PAW PATROL" and "patrol." In an embodiment, the n-gram search component 406 performs a fuzzy match of the n-gram of the token with the n-gram candidates from domain entities index 312.

Phoneme search component 408 communicates with domain entities index 312 to search for phonemes that match the phoneme of the token. For example, phoneme search component 408 performs a search for the phoneme of the token identified in the transcription provided by ASR engine 306, e.g., "pap pʌt ɹoːl" (a precise phonetic form) and/or "P PATRAL" (a lossy phonetic form) in domain entities index 312. The phoneme may produce domain specific candidates based on the phoneme such as "PAW PATROL" and "Paw Patrol toy play."

Candidate generator 410 may then concatenate the candidates provided by one or all of the searches provided by the grapheme search component 404, the N-gram search component 406, and the phoneme search component 408 to form a fuzzy candidate list that includes candidates from at least one of the grapheme search, the N-gram search, and the phoneme search. In an embodiment, the fuzzy candidate list includes at least one candidate from all three searches. Candidate generator 410 may then provide the fuzzy candidate list to a ranker, such as ranker 316 for further ranking.

Figure 5:
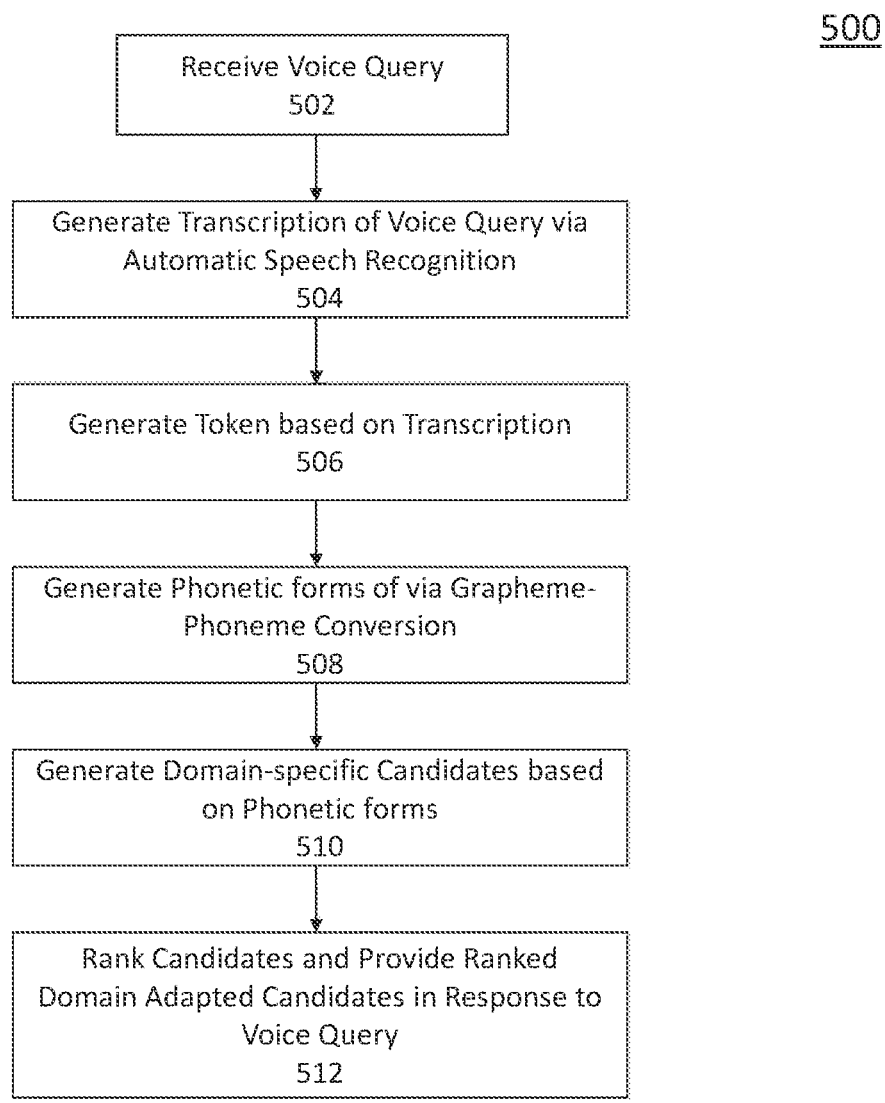
FIG. 5 is a flowchart illustrating a process for processing speech input using a domain adapted audio command processing module, according to some embodiments.

FIG. 5 is a flowchart for a method 500 for processing speech input using a domain adapted audio command processing module, according to some embodiments. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to those example embodiments.

Method 500 relates to the run-time process for processing voice queries as they are received.

In 502, the domain adapted audio command processing module 130 receives a voice query from a user. Domain adapted audio command processing module 130 may be implemented in any user device, such as media device 106, display device 108, and remote control 110. The voice query may represent a request to retrieve media content such as a movie, music, or television show.

In 504, the domain adapted audio command processing module 130 generates a transcription of the voice query. The transcription may be generated using automatic speech recognition (ASR) engine 306. The transcription is a textual representation of the voice query including all of the components in the query such as the requested media content and the action to be performed on the requested media content. In an embodiment, the textual representation of the requested media content is an imperfect match (i.e., domain mismatch) to the requested media content. In other words, the textual representation may not exactly match the media content in the voice query. For example, a voice query may be "Play PAW PATROL" where "PAW PATROL" represents the requested media content; the textual representation of the requested media content provided by the ASR engine 306 may be "Pop Patrol." In other words, ASR engine 306 may provide a textual representation that is phonetically similar to, but not an accurate representation, of the requested media content.

In 506, the domain adapted audio command processing module 130 may generate, based on the transcription, a token representing each media content being requested in the voice query. The voice query may include more than one entity (e.g., "Play PAW PATROL directed by Karl Bunker") and there is one transcribed token for each entity. In an embodiment, identifying entity tokens may include parsing the transcription to identify one or more command components within the transcription where a command component may include an entity that identifies the requested media content, an identified intent of the voice query, and an identified action to be performed on the requested media content. The identified intent may be determined based on the combination of the entity and the identified action. Continuing the example above, a transcription for a voice query for "Play PAW PATROL" may include the "Play" action and the "Pop Patrol" entity. Based on the combination of these command components, domain audio command processing module 130 may identify that the intent of the voice query is a request for media content (i.e., the content is being requested so that it may be played). Based on the command components identified in the transcription, domain adapted processing module 130 may then generate a token corresponding to the entity. The token may be in a text form.

In 508, the domain adapted audio command processing module 130 may generate phonetic forms of the tokens via a grapheme-phoneme conversion process. In an embodiment, this step may include converting the token into a phonetic representation of the entity. Examples of the phonetic representation were discussed above with respect to FIGS. 3 and 4 and include the grapheme of the token, the phoneme of the token, and the N-gram of the token.

In 510, the domain adapted audio command processing module 130 may generate domain specific candidates based on the phonetic forms and provide the candidates in a fuzzy candidate list. The fuzzy candidate list may include fuzzy candidates that represent potential matches to the media content identified by the entity. A goal of the domain adapted audio command processing module 130 is to identify the requested media content in the voice query using what could be an imperfect match represented by the entity in the transcription of the voice query. Accordingly, one of the fuzzy candidates may be an imperfect match to the entity but a perfect match for the requested media content in the voice query. In an embodiment, the matching between the fuzzy candidates and the entity is based on the phonetic representation, including one of the grapheme of the token, the phoneme of the token, and the N-gram of the token, and the token itself.

In an embodiment, generating the domain specific candidates may include at least one a grapheme search, a phoneme search, and an N-gram search.

The grapheme search may be based on the grapheme of the token that is used to identify at least one fuzzy grapheme candidate in domain entities index 312. The identification of the fuzzy grapheme candidate may be based on a spelling comparison between the grapheme of the token and the spelling of the fuzzy grapheme candidates within the domain entities index. At least one of the fuzzy candidates in the fuzzy candidate list may include one fuzzy grapheme candidate.

The spelling comparison may include using the grapheme of the token to search for a grapheme candidate in domain entities index 312 and identifying the grapheme candidate as a fuzzy grapheme candidate if there is a fuzzy match between a spelling of the grapheme to a spelling of the grapheme candidate. This identification may involve retrieving, from an entry in domain entities index 312, the spelling of the grapheme candidate. The domain entities index 312 may be updated to include an entry associated with the grapheme candidate by populating the entry with the spelling of the grapheme candidate. This update of the domain entities index 312 occurs independently of ASR engine 306 that allows for the domain entities index 312 to updated more quickly and does not require retraining of ASR engine 306. The domain entities index 312 may include a number of entries, including the entry, associated with a plurality of grapheme candidates and the domain entity index may be updated on a continuous basis with new entries as they are received.

The phoneme search may include searching the domain entities index 312 based on the phoneme of the token to identify a fuzzy phoneme match based on a phonetic comparison between the phoneme of the token and the fuzzy phoneme candidate. At least one of the fuzzy candidates in the fuzzy candidate list may include one fuzzy phoneme candidate. The phonetic comparison may involve using the phoneme of the token to search for a phoneme candidate in domain entities index 312 and identifying the phoneme candidate as the fuzzy phone candidate based on a phonetic matching between the phoneme of the token and the phoneme candidate by, for example, retrieving the phoneme candidate from the entry. The domain entity index may include an entry associated with the phoneme candidate and may be updated by populating the entry with the phoneme candidate independently of the automatic speech recognition engine.

The N-gram search may include searching the domain entities index 312 based on the N-gram of the token to identify a fuzzy N-gram match based on an N-gram comparison between the token and the fuzzy N-gram candidate. At least one of the fuzzy candidates further may include the fuzzy N-gram match. The N-gram comparison may involve using the N-gram of the token to search for an N-gram candidate in the domain entity index and identifying the N-gram candidate as the fuzzy N-gram candidate based on matching the N-gram of the token to an N-gram of the N-gram candidate. The domain entities index 312 may include an entry associated with the phoneme candidate and performing the search may include retrieving, from the entry, the N-gram of the N-gram candidate.

In 512, domain adapted audio command processing module 130 may rank the candidates in the fuzzy candidate list to form a ranked fuzzy candidate list including a highest ranked fuzzy candidate corresponding to a best potential match for the media content. One or more of the highest ranked candidates in ranked fuzzy candidate list may then be provided in response to the voice query. This may include performing an action associated with the highest ranked fuzzy candidate. In an embodiment, ranking the candidate may include ranking the fuzzy grapheme match, the fuzzy N-gram match, and the fuzzy phoneme match in the fuzzy candidate list to form a ranked candidate list.

In an embodiment, the highest ranked fuzzy candidate in the ranked candidate list corresponds to the best potential match for the media content requested by the voice query and that is represented by the token. The highest ranked fuzzy candidate may be determined based on any number of ranking criteria including at least one of a phonetic edit distance, a popularity score, a match count, a longest common sequence score, and a nospace overlap score, as discussed above.

Providing the ranked domain adapted candidates may include performing an action such as displaying the fuzzy candidates on display device 108 and waiting for a user selection from a user device (e.g., remote control 110, media device 106). Additional actions may occur after display of the fuzzy candidates including receiving a selection of the highest ranked fuzzy candidate from the user device, retrieving the highest ranked fuzzy candidate from a database (e.g., content server 120), and sending the ranked fuzzy list including the highest ranked fuzzy candidate to media device 106.

Figure 6:
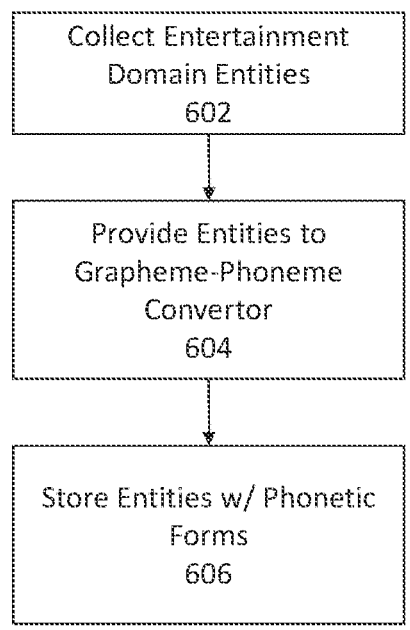
FIG. 6 is a flowchart illustrating a process for updating a domain entities index, according to some embodiments.

FIG. 6 is a flowchart illustrating a process for updating a domain entities index, according to some embodiments. Method 600 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-4. However, method 600 is not limited to those example embodiments.

Method 600 relates to the ingestion process for populating domain entities index 312 with new entities as they are received from entertainment domain entity source(s) 304.

In 602, domain adapted audio command processing module 130 may collect entertainment domain entities. In an embodiment, collection may be a push process where entertainment domain entity source(s) 304 automatically pushes new entities on a continuous or scheduled basis. In an embodiment, collection may be a pull process where domain adapted audio command processing module 130 submits requests to entertainment domain entity source(s) 304 to provide updated entities.

In 604, domain adapted audio command processing module 130 provides the new entities to grapheme-phoneme converter 310 for conversion of the entities into phonetic forms.

In 606, domain adapted audio command processing module 130 stores the entities along with phonetic forms in domain entities index 312 as index entries to facilitate searching and retrieval of information during run-time such as by fuzzy candidate generator 314 when generating fuzzy candidates in response to a voice query.

Example Computer System

Figure 7:
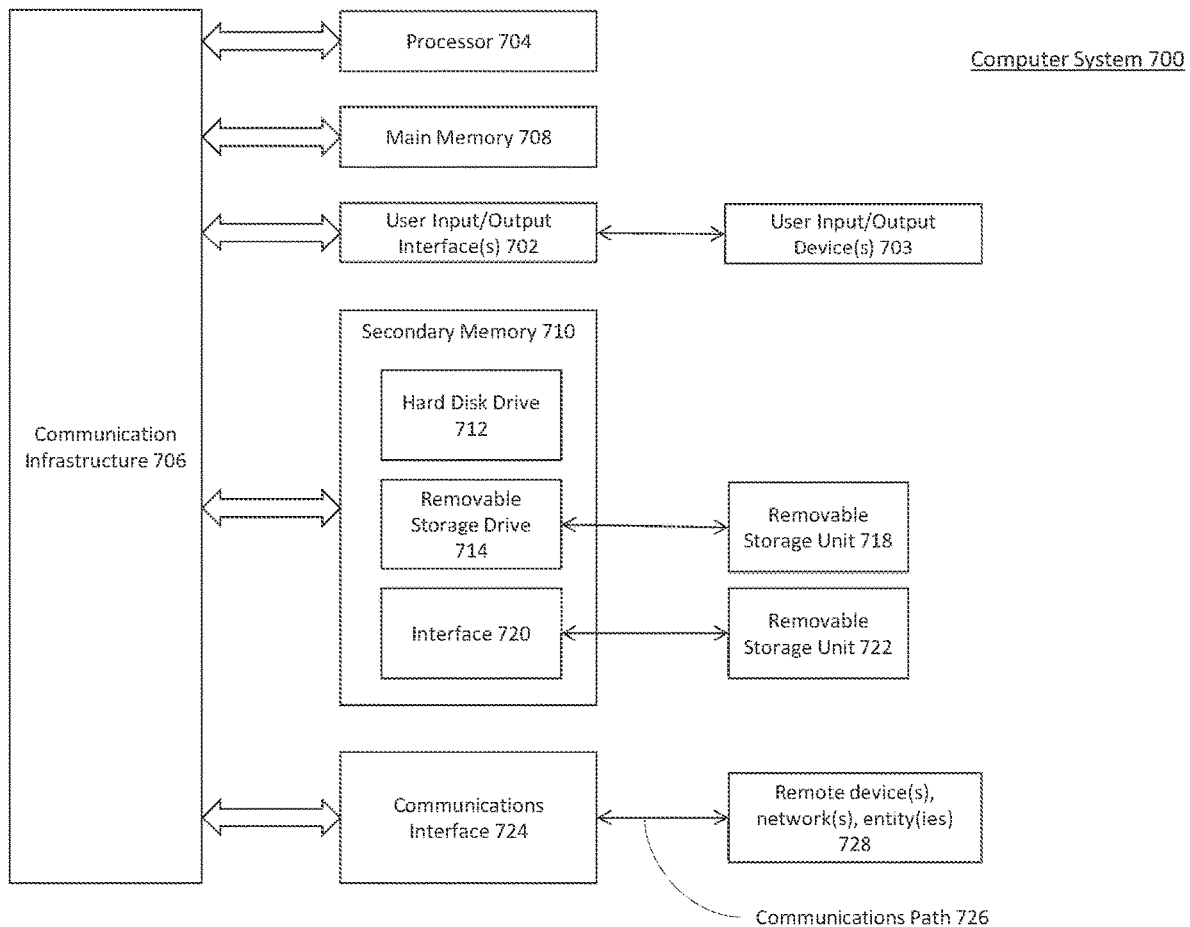
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, the media device 106 may be implemented using combinations or sub-combinations of computer system 700. Also or alternatively, one or more computer systems 700 may be used to implement any of the embodiments discussed herein, as well as combinations and sub-combinations thereof.

Computer system 700 includes one or more processors (also called central processing units, or CPUs), such as processor 704. Processor 704 is connected to communications infrastructure 706 (e.g., a bus).

In some embodiments, processor 704 can be a graphics processing unit (GPU). In some embodiments, a GPU may be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communications infrastructure 706 through user input/output interface(s) 702.

Computer system 700 also includes main memory 708 (e.g., a primary memory or storage device), such as random access memory (RAM). Main memory 708 can include one or more levels of cache. Main memory 708 may have stored therein control logic (i.e., computer software) and/or data.

Computer system 700 can also include one or more secondary storage devices or memories such as secondary memory 710. Secondary memory 710 can include, for example, hard disk drive 712, removable storage drive 714 (e.g., a removable storage device), or both. Removable storage drive 714 can be a floppy disk drive, a magnetic tape drive, a compact disk drive, an optical storage device, tape backup device, and/or any other storage device/drive.

Removable storage drive 714 can interact with removable storage unit 718. Removable storage unit 718 includes a computer usable or readable storage device having stored thereon computer software (e.g., control logic) and/or data. Removable storage unit 718 can be a floppy disk, magnetic tape, compact disk, DVD, optical storage disk, and/any other computer data storage device. Removable storage drive 714 may read from and/or write to removable storage unit 718.

In some embodiments, secondary memory 710 can include other means, devices, components, instrumentalities or other approaches for allowing computer programs and/or other instructions and/or data to be accessed by computer system 700. Such means, devices, components, instrumentalities or other approaches can include, for example, removable storage unit 722 and interface 720. Examples of removable storage unit 722 and interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communications interface 724 (e.g., a network interface). Communications interface 724 may enable computer system 700 to communicate and interact with any combination of external or remote devices, external or remote networks, remote entities, etc. (individually and collectively referenced by reference number 728). For example, communications interface 724 can allow computer system 700 to communicate with external or remote devices 728 over communications path 726, which can be wired, wireless, or a combination thereof, and which can include any combination of LANs, WANs, the Internet, etc. Control logic and/or data can be transmitted to and from computer system 700 via communications path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (DRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical Interchange Format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (ALAC), Audio Data Transport Stream (ADTS), Audio Interchange File Format (AIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multistream (MS12), Free Lossless Audio Codec (FLAC), Linear Pulse Code Modulation (LPCM or PCM), Matroska Audio (MKA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video Interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (JSON), HD Adaptive Streaming, HTTP Dynamic Streaming, HTTP Live Streaming (HLS), HTTP Secure (HTTPS), Hypertext Transfer Protocol (HTTP), Internet Information Services (IIS) Smooth Streaming (SMOOTH), Media RSS (MRSS), MPEG Dynamic Adaptive Streaming over HTTP (MPEG-DASH or DASH), MPEG transport stream (MPEG-TS or TS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), Play- Ready, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for adapting an automatic speech recognition engine implemented within a multimedia environment, comprising:

receiving, at a user device, a voice query that includes identification of requested media content and an action to be performed on the requested media content, wherein the identification of the requested media content comprises a first entity representing a title of the requested media content and a second entity representing at least one metadata associated with the requested media content;

generating a transcription of the voice query, wherein the transcription is generated using the automatic speech recognition engine, wherein the transcription includes an imperfect textual representation of the requested media content;

parsing the transcription to identify the first entity and the second entity;

generating a phonetic representation of the requested media content based on the first entity and the second entity;

generating, based on the phonetic representation, a fuzzy candidate list comprising a plurality of fuzzy candidates representing potential matches to the requested media content, wherein each fuzzy candidate of the plurality of fuzzy candidates is associated with a popularity score;

ranking the fuzzy candidate list to form a ranked fuzzy candidate list including a highest ranked fuzzy candidate corresponding to a best potential match for the requested media content, wherein the highest ranked fuzzy candidate corresponding to the best potential match for the requested media content is determined based on a comparison of the popularity score of each fuzzy candidate of the plurality of fuzzy candidates; and performing the action associated with the highest ranked fuzzy candidate.

2. The computer-implemented method of claim 1, wherein the user device is one of a remote control, a media device, or a display device.

3. The computer-implemented method of claim 1, wherein a first fuzzy candidate of the plurality of fuzzy candidates is associated with a first popularity score and a second fuzzy candidate of the plurality of fuzzy candidates is associated with a second popularity score.

4. The computer-implemented method of claim 3, wherein each fuzzy candidate is associated with a match count including the first fuzzy candidate being associated with a first match count and the second fuzzy candidate being associated with a second match count, wherein the match count comprises a numerical value indicating a number of matching strategies that indicate each fuzzy candidate as being a quality match to the requested media content.

5. The computer-implemented method of claim 4, wherein the matching strategies comprises at least two of grapheme spelling, grapheme n-gram, and phoneme.

6. The computer-implemented method of claim 3, further comprising:
    determining the first popularity score of the first fuzzy candidate based on a first frequency of performed actions associated with the first fuzzy candidate within the multimedia environment; and
    determining the second popularity score of the second fuzzy candidate based on a second frequency of performed actions associated with the second fuzzy candidate with the multimedia environment.

7. The computer-implemented method of claim 6, wherein the performed actions are based on metrics associated with the first fuzzy candidate and the second fuzzy candidate collected within the multimedia environment.

8. The computer-implemented method of claim 6, wherein the first frequency of performed actions comprises at least one of a number of times the first fuzzy candidate was streamed within the multimedia environment or a number of times the first fuzzy candidate was requested within the multimedia environment.

9. An apparatus implemented within a multimedia environment comprising:
    a memory; and
    at least one processor communicatively coupled to the memory and configured to:
        receive a voice query that includes identification of requested media content and an action to be performed on the requested media content, wherein the identification of the requested media content comprises a first entity representing a title of the requested media content and a second entity representing at least one metadata associated with the requested media content;
        generate a transcription of the voice query, wherein the transcription is generated using an automatic speech recognition engine, wherein the transcription includes an imperfect textual representation of the requested media content;
        parse the transcription to identify the first entity and the second entity;
        generate a phonetic representation of the requested media content based on the first entity and the second entity;
        generate, based on the phonetic representation, a fuzzy candidate list comprising a plurality of fuzzy candidates representing potential matches to the requested media content, wherein each fuzzy candidate is associated with a popularity score;
        rank the fuzzy candidate list to form a ranked fuzzy candidate list including a highest ranked fuzzy candidate corresponding to a best potential match for the requested media content, wherein the highest ranked fuzzy candidate corresponding to the best potential match for the requested media content is determined based on a comparison of the popularity score of each fuzzy candidate of the plurality of fuzzy candidates; and
        perform the action associated with the highest ranked fuzzy candidate.

10. The apparatus of claim 9, wherein the apparatus is implemented as one of a remote control, a media device, or a display device.

11. The apparatus of claim 9, wherein a first fuzzy candidate of the plurality of fuzzy candidates is associated with a first popularity score and a second fuzzy candidate of the plurality of fuzzy candidates is associated with a second popularity score.

12. The apparatus of claim 11, wherein each fuzzy candidate is associated with a match count including the first fuzzy candidate being associated with a first match count and the second fuzzy candidate being associated with a second match count, wherein the match count comprises a numerical value indicating a number of matching strategies that indicate each fuzzy candidate as being a quality match to the requested media content.

13. The apparatus of claim 12, wherein the matching strategies comprises at least two of grapheme spelling, grapheme n-gram, and phoneme.

14. The apparatus of claim 11, wherein the at least one processor is further configured to:
    determine the first popularity score of the first fuzzy candidate based on a first frequency of performed actions associated with the first fuzzy candidate within the multimedia environment; and
    determine the second popularity score of the second fuzzy candidate based on a second frequency of performed actions associated with the second fuzzy candidate with the multimedia environment.

15. The apparatus of claim 14, wherein the first frequency of performed actions comprises at least one of a number of times the first fuzzy candidate was streamed within the multimedia environment or a number of times the first fuzzy candidate was requested within the multimedia environment.

16. A non-transitory computer-readable medium storing instructions, wherein the instructions, when executed by at least one processor, cause the at least one processor to perform operations comprising:
    receiving, at a user device, a voice query that includes identification of requested media content and an action to be performed on the requested media content, wherein the identification of the requested media content comprises a first entity representing a title of the requested media content and a second entity representing at least one metadata associated with the requested media content;
    generating a transcription of the voice query, wherein the transcription is generated using an automatic speech recognition engine, wherein the transcription includes an imperfect textual representation of the requested media content;
    parsing the transcription to identify the first entity and the second entity;
    generating a phonetic representation of the requested media content based on the first entity and the second entity;
    generating, based on the phonetic representation, a fuzzy candidate list comprising a plurality of fuzzy candidates representing potential matches to the requested media content, wherein each fuzzy candidate is associated with a popularity score;
    ranking the fuzzy candidate list to form a ranked fuzzy candidate list including a highest ranked fuzzy candidate corresponding to a best potential match for the requested media content, wherein the highest ranked fuzzy candidate corresponding to the best potential match for the requested media content is determined based on a comparison of the popularity score of each fuzzy candidate of the plurality of fuzzy candidates; and performing the action associated with the highest ranked fuzzy candidate.

17. The non-transitory computer-readable medium of claim 16, wherein a first fuzzy candidate of the plurality of fuzzy candidates is associated with a first popularity score and a second fuzzy candidate of the plurality of fuzzy candidates is associated with a second popularity score.

18. The non-transitory computer-readable medium of claim 17, wherein each fuzzy candidate is associated with a match count including the first fuzzy candidate being associated with a first match count and the second fuzzy candidate being associated with a second match count, wherein the match count comprises a numerical value indicating a number of matching strategies that indicate each fuzzy candidate as being a quality match to the requested media content.

19. The non-transitory computer-readable medium of claim 17, the operations further comprising:

determining the first popularity score of the first fuzzy candidate based on a first frequency of performed actions associated with the first fuzzy candidate within a multimedia environment; and determining the second popularity score of the second fuzzy candidate based on a second frequency of performed actions associated with the second fuzzy candidate with the multimedia environment.

20. The non-transitory computer-readable medium of claim 19, wherein the first frequency of performed actions comprises at least one of a number of times the first fuzzy candidate was streamed within the multimedia environment or a number of times the first fuzzy candidate was requested within the multimedia environment.

* * * * *